(12) United States Patent
Ren et al.

(10) Patent No.: US 11,162,179 B2
(45) Date of Patent: Nov. 2, 2021

(54) THREE-DIMENSIONAL POROUS NISE2 FOAM-BASED HYBRID CATALYSTS FOR ULTRA-EFFICIENT HYDROGEN EVOLUTION REACTION IN WATER SPLITTING

(71) Applicant: University of Houston System, Houston, TX (US)

(72) Inventors: Zhifeng Ren, Pearland, TX (US); Haiqing Zhou, Houston, TX (US); Fang Yu, Houston, TX (US); Shuo Chen, Houston, TX (US)

(73) Assignee: UNIVERSITY OF HOUSTON SYSTEM, Houston, TX (US)

( * ) Notice: Subject to any disclaimer, the term of this patent is extended or adjusted under 35 U.S.C. 154(b) by 295 days.

(21) Appl. No.: 16/302,572

(22) PCT Filed: May 17, 2017

(86) PCT No.: PCT/US2017/033143
§ 371 (c)(1),
(2) Date: Nov. 16, 2018

(87) PCT Pub. No.: WO2017/201186
PCT Pub. Date: Nov. 23, 2017

(65) Prior Publication Data
US 2019/0218674 A1 Jul. 18, 2019

Related U.S. Application Data

(60) Provisional application No. 62/337,730, filed on May 17, 2016.

(51) Int. Cl.
*C25B 11/091* (2021.01)
*H01M 4/86* (2006.01)
(Continued)

(52) U.S. Cl.
CPC .............. *C25B 11/091* (2021.01); *C25B 1/04* (2013.01); *C25B 11/031* (2021.01);
(Continued)

(58) Field of Classification Search
CPC ......... C25B 1/04–1/044; C25B 11/03–11/032; C25B 11/04; C25B 11/051;
(Continued)

(56) References Cited

U.S. PATENT DOCUMENTS

2010/0255660 A1   10/2010   Singh et al.
2011/0045350 A1   2/2011    Amos et al.

FOREIGN PATENT DOCUMENTS

CN          104923268 A      9/2015

OTHER PUBLICATIONS

Chang et al ("Highly Effi cient Electrocatalytic Hydrogen Production by MoS x Grown on Graphene-Protected 3D Ni Foams", Advanced Materials, 2013, 25, pp. 756-760) (Year: 2013).*
(Continued)

*Primary Examiner* — Alexander W Keeling
(74) *Attorney, Agent, or Firm* — Conley Rose, P.C.

(57) ABSTRACT

A hybrid three dimensional (3D) hydrogen evolution reaction (HER) catalyst that is formed from a porous Ni foam support, a $NiSe_2$ scaffold positioned on the support; and layered transition metal dichalcogenide (LTMDC) or first-row transition metal dichalcogenide particles positioned on the $NiSe_2$ scaffold. The catalyst provides a low onset potential, large cathode current density, small Tafel slopes, and large exchange current densities, similar in catalytic power to Pt HER catalysts.

20 Claims, 11 Drawing Sheets

(51) Int. Cl.
| | |
|---|---|
| H01M 4/90 | (2006.01) |
| C25B 11/031 | (2021.01) |
| C25B 11/051 | (2021.01) |
| C25B 11/057 | (2021.01) |
| C25B 11/075 | (2021.01) |
| C25B 1/04 | (2021.01) |

(52) U.S. Cl.
CPC .......... *C25B 11/051* (2021.01); *C25B 11/057* (2021.01); *C25B 11/075* (2021.01); *H01M 4/8605* (2013.01); *H01M 4/90* (2013.01); *Y02E 60/36* (2013.01)

(58) Field of Classification Search
CPC .... C25B 11/052–11/053; C25B 11/054; C25B 11/055; C25B 11/057–11/069; C25B 11/073; C25B 11/075–11/077; C25B 11/091; C25B 11/00–11/097; H01M 4/8605; H01M 4/90–4/926
See application file for complete search history.

(56) References Cited

OTHER PUBLICATIONS

Li et al ("In situ Grown Pyramid Structures of Nickel Diselenides Dependent on Oxidized Nickel Foam as Efficient Electrocatalyst for Oxygen Evolution Reaction", Electrochemca Acta, Apr. 2016, 205, pp. 77-84) (Year: 2016).*
Li et al ("In situ Grown Pyramid Structures of Nickel Diselenides Dependent on Oxidized Nickel Foam as Efficient Electrocatalyst for Oxygen Evolution Reaction", Electrochimica Acta, 205, Apr. 2016, pp. 77-84) (Year: 2016).*
Kwak et al ("CoSe2 and NiSe2 Nanocrystals as Superior Bifunctional Catalysts for Electrochemical and Photoelectrochemical Water Splitting", ACS Appl. Mater. Interfaces, Feb. 2016, 8, 8, pp. 5327-5334) (Year: 2016).*
Wang et al ("Enhanced Electrochemical H2 Evolution by Few-Layered Metallic WS2(1-x)Se2x Nanoribbons", Advanced Functional Materials, 2015, 215, pp. 6077-6083). (Year: 2015).*
Xia et al ("Selenide-Based Electrocatalysts and Scaffolds for Water Oxidation Applications", Advanced Materials, Jan. 2016, 28 , 1, pp. 77-85) (Year: 2016).*
Schmidt ("Microporous and Mesoporous Materials", The Official Journal of the International Zeolite Association). (Year: 2011).*
Kuleshov et al ("Development and characterization of new nickel coatings for application in alkaline water electrolysis", International Journal of Hydrogen Energy, 41, 2015, pp. 36-45). (Year: 2015).*
Chinese Office Action dated Dec. 30, 2020, for Chinese Application No. 201780037607.9 (31 p.).
English Summary of Chinese Office Action dated Dec. 30, 2020, for Chinese Application No. 201780037607.9 (4 p.).
European Patent Application No. 17800107.9 Search Report and Written Opinion dated Dec. 16, 2019 (7 pages).
Zhou et al., "One-step synthesis of self-supported porous NiSe2/Ni hybrid foam: An efficient 3D electrode for hydrogen evolution reaction," Nano Energy, vol. 20, Dec. 19, 2015, pp. 29-36.
European Patent Application No. 17800107.9 Examination Report dated Aug. 5, 2020 (5 pages).
International Patent Application No. PCT/US2017/033143 International Search Report and Written Opinion dated Aug. 23, 2017 (15 pages).
Chang et al., "Highly Efficient Electrocatalytic Hydrogen Production by MoSx Grown on Graphene-Protected 3D Ni Foams," Advanced Materials, pp. 756-760, Oct. 12, 2012, 25, full text, retrieved from http://onlinelibrary.wiley.com/doi/10.1002/adma.201202920/full on Jul. 17, 2017 (5 pages).
Li et al., "In situ Grown Pyramid Structures of Nickel Diselenides Dependent on Oxidized Nickel Foam as Efficient Electrocatalyst for Oxygen Evolution Reaction," Electrochimica Acta, pp. 77-84, Apr. 21, 2016, 205, full text, retrieved from http://www.sciencedirect.com/science/article/pii/S0013468616309458 on Jul. 17, 2017 (9 pages).
Wang et al., "Enhanced Electrochemical H2 Evolution by Few-Layered Metallic WS2(1-x)Se2x Nanoribbons," Advanced Functional Materials, pp. 1-7, Sep. 9, 2015, full text, retrieved from http://onlinelibrary.wiley.com/doi/10.1002/adfm.201502680/abstract on Jul. 17, 2017 (8 pages).
Wang et al., "Recent Advances in transition metal dichalcogenide based nanomaterials for water splitting," Nanoscale, Nov. 6, 2015, full text retrieved from http://pubs.rsc.org/en/content/articlelanding/2015/nr/c5nr06718a#!divAbstract on Jul. 17, 2017 (26 pages).
Kwak et al., "CoSe2 and NiSe2 Nanocrystals as Superior Bifunctional Catalysts for Electrochemical and Photoelectrochemical Water Splitting," Applied Materials & Interfaces, pp. 5327-5334, Feb. 5, 2016, 8, full text, retrieved from http://pubs.acs.org/doi/abs/10.1021/acsami.5b12093?src=recsys on Jul. 17, 2017 (8 pages).
Pu et al., "Efficient Electrochemical Water Splitting Catalyzed by Electrodeposited Nickel Diselenide Nanoparticles Based Film," Applied Materials & Interfaces, pp. 4718-4723, Jan. 29, 2016, 8, full text, retrieved from http://pubs.acs.org/doi/abs/10.1021/acsami.5b12143 on Jul. 17, 2017 (6 pages).
Kong et al., "CoSe2 Nanoparticles Grown on Carbon Fiber Paper: An Efficient and Stable Electrocatalyst for Hydrogen Evolution Reaction," Journal of the American Chemical Society, pp. 4897-4900, Mar. 14, 2014, 136, full text, retrieved from http://pubs.acs.org/doi/abs/10.1021/ja501497n on Jul. 17, 2017 (4 pages).
Chinese Office Action dated Aug. 19, 2021, for Chinese Application No. 201780037607.9 (3 p.).
English Summary of Chinese Office Action dated Aug. 19, 2021, for Chinese Application No. 201780037607.9 (2 p.).

* cited by examiner

THREE-DIMENSIONAL POROUS NISE2 FOAM-BASED HYBRID CATALYSTS FOR ULTRA-EFFICIENT HYDROGEN EVOLUTION REACTION IN WATER SPLITTING

CROSS-REFERENCE TO RELATED APPLICATIONS

This application is a National Phase entry of, and claims priority to PCT Application No. PCT/US2017/033143, filed May 17, 2017, which claims benefit of U.S. provisional patent application Ser. No. 62/337,730 filed May 17, 2016, and titled "Three-Dimensional Porous $NiSe_2$ Foam-Based Hybrid Catalysts For Ultra-Efficient Hydrogen Evolution Reaction In Water Splitting," which is hereby incorporated herein by reference in its entirety the entire contents of each hereby incorporated by reference herein for all purposes.

STATEMENT REGARDING FEDERALLY SPONSORED RESEARCH OR DEVELOPMENT

This invention was made with government support under Grant No. FA 7000-13-10001 awarded by the United States Defense Threatening Reduction Agency (DTRA). The United States government has certain rights in the invention.

BACKGROUND

Field of the Disclosure

This disclosure generally relates to three-dimensional (3D) porous $NiSe_2$ foam-based hybrid catalysts.

Background of the Technology

With the consumption of fossil fuels and their detrimental impact on the environment, methods of generating clean power are required. Hydrogen is an ideal carrier for renewable energy, but $H_2$ generation is inefficient due to the lack of robust catalysts that are substantially cheaper than platinum (Pt). Therefore, there is a recognized need in the field for robust and durable earth-abundant, cost-effective catalysts that are highly desirable for $H_2$ generation from water splitting via a hydrogen evolution reaction (HER).

BRIEF SUMMARY OF THE DISCLOSURE

Herein disclosed, are highly active and durable earth-abundant transition metal dichalcogenides-based hybrid catalysts that exhibit HER activity approaching the performance of-Pt-based catalysts of the prior art, and in some embodiments are also more efficient than those on transitional parent metal dichalcogenides (such as, but not limited to: $MoS_2$, $WS_2$, $CoSe_2$, etc.). The catalysts described herein are constructed by growing in ternary $MoS_{2(1-x)}Se_{2x}$ particles or $WS_{2(1-x)}Se_{2x}$ on a 3D self-standing porous $NiSe_2$ foam, leading to in some embodiments, better catalytic activity than $MoS_2$, $MoSe_2$ or $NiSe_2$ alone, as supported by calculations. This disclosure, therefore provides a new pathway to cheap, efficient, and sizable hydrogen-evolving electrodes by simultaneously tuning the number of catalytic active sites, porous structures, heteroatom doping and electrical conductivity by growing ternary $MoS_{2(1-2)}Se_{2x}$ or $WS_{2(1-x)}Se_{2x}$ particles on porous $NiSe_2$ foam with excellent catalytic activity comparable to precious Pt catalysts, suggesting applications in large-scale water splitting.

The disclosure is further drawn to methods of making such three-dimensional (3D) porous $NiSe_2$ foam-based hybrid catalysts wherein porous $NiSe_2$ foam is synthesized by direct selenization of commercial Ni foam, first-row transition metal dichalcogenides (TMDC) such as $CoS_2$, $CoSe_2$, $FeSe_2$, $FeS_2$, $NiSe_2$, $NiS_2$, layered TMDC catalysts ($MoS_2$, $WS_2$, $MoSe_2$, etc.) or combinations thereof are then grown on its surface. The disclosure is still further drawn to catalysts as described herein, which are constructed in some embodiments by growing ternary $MoS_{2(1-x)}Se_{2x}$ or $WS_{2(1-x)}Se_{2x}$ particles on a 3D self-standing porous $NiSe_2$ foam.

Herein disclosed are exemplary embodiments of a three dimensional (3D) porous hydrogen evolution reaction (HER) catalyst.

In some embodiments herein disclosed is a three dimensional (3D) hydrogen evolution reaction (HER) catalyst, comprising a porous Ni foam support; a $NiSe_2$ scaffold positioned on the support; and layered transition metal dichalcogenide (LTMDC), or first-row TMDC particles with binary or ternary phase positioned on the $NiSe_2$ scaffold, in some embodiments of the catalyst the transition metal dichalcogenides (LTMDC) are selected from the group consisting of $CoS_2$, $CoSe_2$, $FeS_2$, $FeSe_2$, $NiSe_2$, $NiS_2$, $MoS_2$, $WS_2$, $MoSe_2$, $WSe_2$, and a combination of any of the foregoing, in other embodiments the layered transition metal dichalcogenides (LTMDC) particles are $MoS_{2(1-x)}Se_{2x}$ or $WS_{2(1-x)}Se_{2x}$ particles, in further embodiments the layers of $MoS_{2(1-x)}Se_{2x}$ or $WS_{2(1-x)}Se_{2x}$ particles are vertically oriented layers. In some embodiments a catalyst comprises a $NiSe_2$ scaffold, which further comprises mesoporous pores. In some embodiments, the mesoporous pores are between 0.001 nm and 50 nm in diameter, and in other embodiments, the pores comprise a surface roughness (Ra) of between 0.1 and 50, 1 and 30, and 10 and 20, and 0.1 and 10. In some embodiments herein disclosed the $NiSe_2$ scaffold comprises active edge sites for HER. In some embodiments herein disclosed the catalyst has at least one of: a low onset potential, large cathode current density, small Tafel slopes, or large exchange current density.

In some embodiments a low onset or overpotential is between −10 and −200 mV, in other embodiments a low onset potential is between about −20 mV and about −145 mV, in further embodiments a low onset potential is between −50 and −100 mV. In some further embodiments a low onset potential is −20 mV; and in another embodiment the low onset potential is −145 mV.

In some embodiments a large current density is about −10 mV at 10 mA/cm$^2$ to about −120 mV at 10 mA/cm$^2$, in other embodiments a large current density is about −50 mV at 10 mA/cm$^2$ to about −100 mV at 10 mA/cm$^2$, and in further embodiments a large current density is about −70 mV at 10 mA/cm$^2$ to about −100 mV at 10 mA/cm$^2$, in a further embodiment a large current density is about −69 mV at 10 mA/cm$^2$, and in a still further embodiment a large current density is about −88 mV at 10 mA/cm$^2$. In some embodiments the current density may be a cathode current density.

In some embodiments a low Tafel slope is about 10 mV/dec to about 100 mV/dec, in other embodiments a low Tafel slope is about 20 mV/dec to about 80 mV/dec, and in further embodiments a low Tafel slope is about 40 to about 60 mV/dec, in another further embodiment, a low Tafel slope is about 43 mV/dec, and in a still further embodiment a low Tafel slope is about 46.7 mA/dec.

In some embodiments a large exchange current density is about 10 to about 1000 µA/cm$^2$, in other embodiments a large exchange current density is about 100 to about 600 µA/cm$^2$, and in another embodiment a large exchange current density is about 200 to about 600 µA/cm², in a further embodiment a large exchange current density is about 495 µAcm², and in a still further embodiment a large exchange current density is about 214.7 µA/cm². µA/cm2

In other embodiments a method of making a three dimensional hydrogen evolution reaction (HER) catalyst is disclosed, comprising: positioning a porous Ni foam support, selenizating the Ni foam support, and forming a NiSe$_2$ scaffold; and growing a layered transition metal dichalcogenides (LTMDC) particles on the NiSe$_2$ scaffold, to form a three dimensional hydrogen evolution reaction (HER) catalyst. In some embodiments selenizating is in an Ar atmosphere, in other embodiments selenizating is at 450° C.—600° C. In some embodiments of the method herein disclosed, the NiSe$_2$ scaffold is HER active, and the grown layered transition metal dichalcogenides comprises a large number of exposed active edge sites. In other embodiments the layered transition metal dichalcogenide particles are of $MoS_{2(1-x)}Se_{2x}$ particles. In other embodiments the layered transition metal dichalcogenide particles are of MoS$_2$, MoSe$_2$, WS$_2$, WSe$_2$ or $WS_{2(1-x)}Se_{2x}$. In some embodiments herein disclosed growing of the $MoS_{2(1-x)}Se_{2x}$ particles or $WS_{2(1-x)}Se_{2x}$ particles are in a vertical layer orientation from the NiSe$_2$ scaffold. In some embodiments herein disclosed growing of the $WS_{2(1-x)}Se_{2x}$ particles are in an edge-orientation from the NiSe$_2$ scaffold. In some embodiments, one layer of $MoS_{2(1-x)}Se_{2x}$ particles or $WS_{2(1-x)}Se_{2x}$ particles is about 0.1 to 75 nm in thickness. In other embodiments herein disclosed, one layer of $MoS_{2(1-x)}Se_{2x}$ particles or $WS_{2(1-x)}Se_{2x}$ particles is about 0.62 nm in thickness. In some embodiments the surface is grown at between 450° C. and 600° C., and in other embodiments, the layer of $MoS_{2(1-x)}Se_{2x}$ particles or $WS_{2(1-x)}Se_{2x}$ particles is grown at 500° C. degrees. In some embodiments herein disclosed the catalyst comprises a large 3-D porous surface area.

In some embodiments herein disclosed is an electrode, comprising: a three dimensional Hydrogen Evolution Reaction (HER) catalyst, wherein the electrode comprises, a porous NiSe$_2$ foam support, and layered transition metal dichalcogenides (LTMDC) particles, or first-row transition metal dichalcogenides positioned on the NiSe$_2$ scaffold, and wherein the catalyst has at least one of: an low onset potential, large cathode current density, small Tafel slopes and large exchange current density.

BRIEF DESCRIPTION OF THE DRAWINGS

(FIG. 1A)=The procedures for growing $MoS_{2(1-x)}Se_{2x}$ particles on porous NiSe$_2$ foam. (FIG. 1B)=Typical low (left) and high (right)-magnification SEM images showing the surface roughness of the NiSe$_2$ foam grown at 600° C. from commercial Ni foam. (FIG. 1C)=Low (left) and high (right)-magnification SEM images showing the morphologies of ternary $MoS_{2(1-x)}Se_{2x}$ particles distributed on porous NiSe$_2$ foam grown at 500° C.

(FIG. 2A, and FIG. 2B)=TEM images showing the vertical layer orientation of $MoS_{2(1-x)}Se_{2x}$ particles grown on different regions of porous NiSe$_2$ foam. Scale bar: 5 nm. (FIG. 2C-FIG. 2E)=Detailed XPS analysis of the Mo 3d, S 2p and Se 3d spectra in different samples, such as binary MoS$_2$ particles on Si, $MoS_{2(1-x)}Se_{2x}$ particles on Si and $MoS_{2(1-x)}Se_{2x}$ particles on porous NiSe$_2$ foam. (FIG. 2F)=Raman spectra measured on different samples.

(FIG. 3A)=The polarization curves recorded on as-obtained $MoS_{2(1-x)}Se_{2x}$/NiSe$_2$ foam hybrid, binary MoS$_2$/NiSe$_2$ foam hybrid and pure NiSe$_2$ foam electrodes compared to a Pt wire. (FIG. 3B)=Tafel plots of the polarization curves recorded on the catalysts presented in FIG. 3A. (FIG. 3C)=Polarization curves showing negligible current density loss of ternary $MoS_{2(1-x)}Se_{2x}$/NiSe$_2$ hybrid electrodes initially and after 1000 CV cycles. (FIG. 3D)=Time dependence of current density recorded on the $MoS_{2(1-x)}Se_{2x}$/NiSe$_2$ hybrid electrode under a given potential—121 mV. (FIG. 3E)=Plot showing the extraction of the double-layer capacitance ($C_{dl}$) from different electrodes. (FIG. 3F)=Electrochemical impedance spectroscopy (EIS) Nyquist plots of the $MoS_{2(1-x)}Se_{2x}$/NiSe$_2$ hybrid electrode in comparison with binary MoS$_2$/NiSe$_2$ hybrid and pure NiSe$_2$ foam electrodes. The data were fit to the simplified Randles equivalent circuit shown in the inset.

(FIG. 4A)=Calculated adsorption free energy diagram for hydrogen (H*) adsorption at the equilibrium potential for MoSSe/NiSe$_2$ hybrid, binary MoS$_2$ and MoSSe catalysts. (FIG. 4B)=Intermediate structures of hydrogen bound MoSSe/MoSSe, MoSSe/NiSe$_2$(100), MoSSe/NiSe$_2$(110) and MoSSe/NiSe$_2$ (111).

DETAILED DESCRIPTION OF THE DISCLOSED EXEMPLARY EMBODIMENTS

Figure 1:
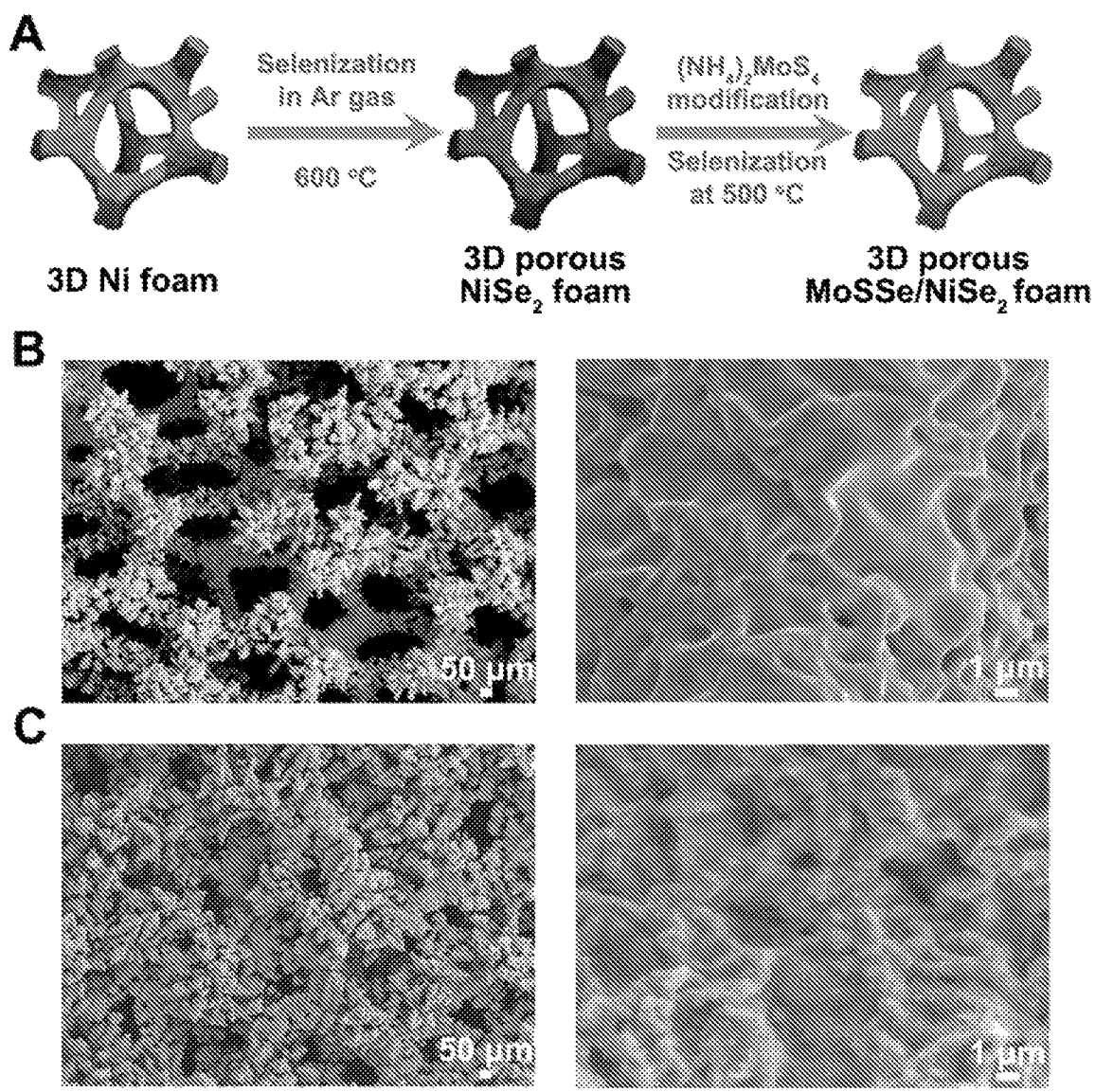
FIG. 1 depicts a schematic diagram, and the morphologies of as-grown porous NiSe$_2$ foam and ternary $MoS_{2(1-x)}Se_{2x}$ particles synthesized on the porous NiSe$_2$ foam.

Three-dimensional porous $NiSe_2$ foam was directly synthesized by direct thermal selenization of commercial Ni foam. Then first-row transition metal dichalcogenides (TMDC) such as $CoS_2$, $CoSe_2$, $FeSe_2$, $FeS_2$, $NiSe_2$, $NiS_2$ or, layered TMDC catalysts ($MoS_2$, $WS_2$, $MoSe_2$, etc.) or the mixed compounds ($Ni_{1-x}Co_xS_2$, $Co_{1-x}Mo_xS_2$, etc.) were grown on its surface. Due to the three-dimensional nature, good electrical conductivity, and mesoporous structures with rough surface, the 3D $NiSe_2$ foam is a suitable conductive scaffold to support other HER-active catalysts. The resulting hybrid catalysts exhibit the desired catalytic performance in the HER, demonstrating low onset potential, large cathode cathodic current density, small Tafel slopes and large exchange current density. Most of the catalysts outperform the state-of-the-art catalysts and exhibit catalytic performance close to the performance of Pt catalysts. Considering the low cost and earth abundance of these compounds, they are alternatives to Pt potentially used in water splitting. In particular, the starting material Ni foam is commercially available, in large scale, and inexpensive so the as-obtained hybrid catalysts can be used as sizable hydrogen evolving electrodes. Further, HER-active porous $NiSe_2$ foam has been directly synthesized from commercial Ni foam, and then utilized as the conductive scaffold for supporting other HER-active catalysts. The resulting hybrid catalysts exhibit improved catalytic performance, compared to the catalysts of the prior art based on layered transition metal dichalcogenides ($MoS_2$, $WS_2$, etc.) and first-row transition metal dichalcogenides ($CoS_2$, $CoSe_2$, $NiSe_2$, etc.) See for example: Zhou H. et al., *Nano Energy* (2016) 20, 29-36, which is incorporated herein in its entirety by reference.

Hydrogen ($H_2$) is a promising energy carrier because of its high energy density and no pollution gas emission. One direct and effective route to generate $H_2$ is based on electro-catalytic hydrogen evolution reaction (HER) from water splitting, in which an efficient catalyst is required to ensure the energy efficiency. Pt-based noble metals are the most active catalysts, but they are not suitable for large-scale applications because of their high costs and scarcity on earth. Thus, some embodiments disclosed herein are drawn to electro-catalysts based on earth-abundant and cost-effective materials and further embodiments are drawn to methods of fabricating electro-catalysts based on earth-abundant and cost-effective materials.

However, most of the Earth-abundant transition metal compounds, such as metal sulfides, selenides, phosphides, carbides, and their composites exhibit inferior catalytic efficiency to Pt, and many involve complicated preparation methods and multiple steps that increase the costs. Progress has been obtained for HER based on layered transition metal dichalcogenides (LTMDs) such as $MoS_2$ either in the form of crystalline or amorphous states, and in molecular mimics, but these prior art catalysts are still inferior to Pt resulting from the low density and reactivity of active sites, poor electrical transport, and inefficient electrical contact to the electrode.

Further, the prior art discloses that carbon-based materials are generally used as the catalyst support for layered transition metal dichalcogenides (LTMDs, $MoS_2$, $WS_2$, etc.) by virtue of their high surface area and good conductivity. The catalytic HER performance of such carbon-supported layered transition metal dichalcogenides is greatly improved, however complex synthesis procedures are required, which lead to increased costs. Double-gyroid structures are also disclosed in the prior art for $MoS_2$ catalyst, and comprise numerous nanopores with exposed edge sites, which are the catalytic active sites rather than the basal planes, but the development bottleneck of the double-gyroid structures is that the catalyst itself has intrinsically poor conductivity. Thus, even though $MoS_2$ has been established as an effective HER catalyst, it has previously been difficult to obtain satisfactory catalysts at low cost on par with the current Pt catalysts.

The majority of HER catalysts of the prior art are based on nanostructures (nanoparticles, nanosheets, etc.) making it necessary to use binder polymers (for example, nafion solution) in order to fasten the catalysts onto conducting substrates, such as glassy carbon electrodes, which increases the cost. This problem can be solved by growing the active catalysts directly onto self-standing conducting skeletons as the current collectors. Therefore, in some embodiments, a catalyst grown on three-dimensional supports with multiple rough surfaces, lots of porous structures and good conductivity is disclosed. Considering the high cost for material synthesis, use of graphene or carbon nanotube is not feasible. Instead, Ni foam is a good starting material because of its low price, commercial availability, and three-dimensional skeleton structure (FIG. 1a). Ni foam is not stable in acid electrolytes because of corrosion. However, direct selenization of Ni foam into porous $NiSe_2$ foam in Ar atmosphere converts Ni foam to porous stable $NiSe_2$ foam (FIG. 1b) that is HER active and stable in acid. Numerous additional mesoporous pores are generated in the $NiSe_2$ regions leading to a rough surface, which provide preferential sites for growing LTMD catalysts with vertically oriented layers. Thus, many active edge sites may be introduced by growing LTMD catalysts on 3D porous $NiSe_2$ foam.

Therefore, disclosed herein in some embodiments, are three-dimensional hybrid catalysts on mesoporous supports which comprise a high surface area for catalyst loading, fast proton transfer and greater contact areas with reactants during the catalytic process. Embodiments disclosed herein are configured to improve the distribution and electrical conductivity of such catalysts on the supports and expose a large number of active edge sites. Furthermore, in some embodiments, arranging two different materials such as growing ternary $MoS_{2(1-x)}Se_{2x}$ particles with vertically aligned layers on a three-dimensional porous HER-active conductive $NiSe_2$ scaffold, has the ability to take advantage of the merits of carbon materials (high surface area and good electrical conductivity), double-gyroid structures (three-dimensional, porous and many exposed edge sites) and synergistic effects between two different catalysts. In some embodiments, such hybrid catalysts display a highly efficient HER performance that approaches the levels of Pt catalysts; and display a catalytic performance superior to that reported on well-studied transitional parent metal dichalcogenides ($MoS_2$, $WS_2$, $CoSe_2$, $NiSe_2$). In some embodiments disclosed herein, 3D porous $NiSe_2$ foam is configured as a conductive skeleton to load ternary $MoS_{2(1-x)}Se_{2x}$ catalysts, thereby utilizing the electrical conductivity, porous structures, and high surface area of the $NiSe_2$ foam. Scanning electron microscopy (SEM; FIG. 1C) images clearly show that small ternary particles are uniformly distributed on the porous $NiSe_2$ foam, indicating that the surface of NiSe$_2$ foam is suitable for dispersing the particles, which is important for the electro-catalytic performance of LMDT catalysts.

EXAMPLES

Example 1

The chemical composition of the as-grown MoS$_{2(1-x)}$Se$_{2x}$ particles were examined by high-resolution transmission electron microscopy (TEM), X-ray photoelectron microscopy (XPS), Raman spectroscopy, and energy dispersive X-ray spectroscopy (EDS). According to the TEM characterizations (FIG. 2a,b), it is obvious that the layers of ternary MoS$_{2(1-x)}$Se$_{2x}$ particles grow with vertical orientation on a large density on NiSe$_2$ surface, suggesting that a large number of active edge sites are exposed at the surface of MoS$_{2(1-x)}$Se$_{2x}$ particles. This is reasonable since the surface of NiSe$_2$ foam is rough and curved, which is favorable for the growth of layered materials with vertically aligned layers.

Figure 2:
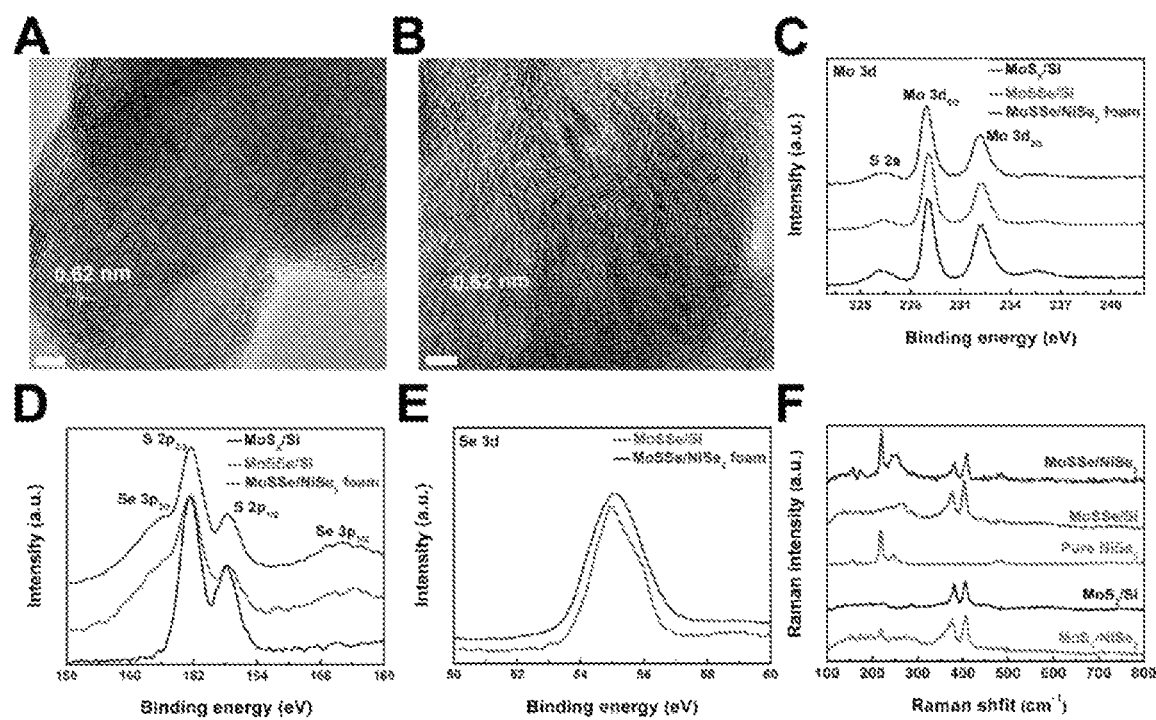
FIG. 2. shows characterization of the ternary $MoS_{2(1-x)}Se_{2x}$/NiSe$_2$ foam hybrid catalysts by high-resolution TEM, XPS and Raman.
Figure 5:
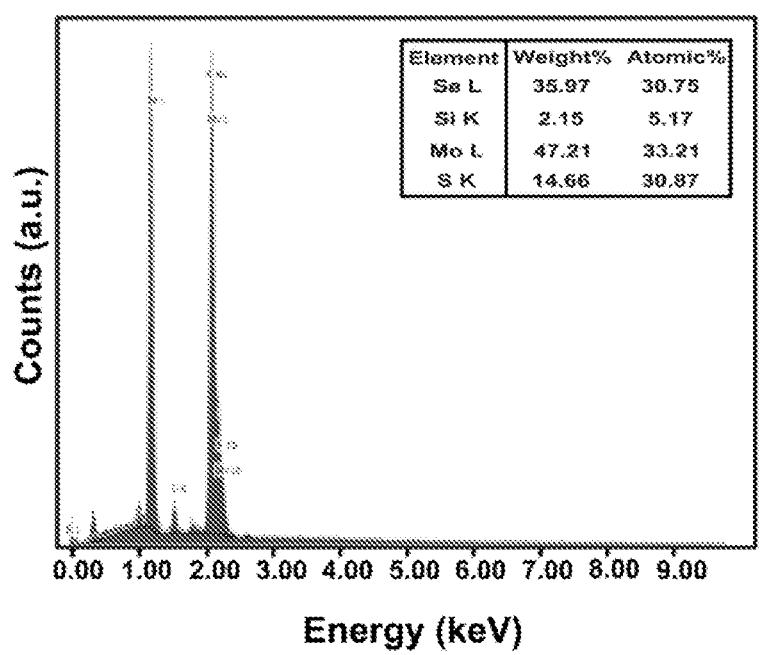
FIG. 5 shows that comparing the relative peak intensity between 250 cm$^{-1}$ and 380 cm$^{-1}$, the estimated atomic ratio between S and Se is about 1.

XPS spectra in the hybrid reveal the presence of Ni, Mo, S, and Se elements (FIGS. 2c-e). However, due to the presence of Se elements in porous NiSe$_2$ foam with an oxidation state similar to MoS$_{2(1-x)}$Se$_{2x}$, it is difficult to demonstrate the selenization of MoS$_2$ after its growth on NiSe$_2$ foam. Instead, to confirm the chemical composition of the molybdenum compound, a precursor-decorated Si substrate is placed under the NiSe$_2$ foam during the second selenization. It is clear that the (NH$_4$)$_2$MoS$_4$ precursor has been converted to a distinctive ternary alloy phase at 500° C. from the prominent Mo, S and Se signals in the XPS spectra (FIGS. 2c-e). Especially in the Raman spectra (FIG. 2f), in comparison with pure MoS$_2$ that two prominent Raman peaks are located at 380 cm$^{-1}$ (E$_{1g}$) and 406 cm$^{-1}$ (A$_{2g}$), there is another obvious Raman peak located at 250 cm$^{-1}$ for the samples with a ternary phase, which can be ascribed to the E$_{2g}$ mode of Mo—Se bond. Compared to Raman mode of bulk MoSe$_2$ crystals (~242 cm$^{-1}$), the blue shifts of this peak to 250 cm$^{-1}$ indicate a ternary a MoS$_{2(1-x)}$, Se$_{2x}$ compound rather than a mixture of two solid phases. This Raman feature is also found when the ternary phase is grown on porous NiSe$_2$ foam, which is consistent with previously reported results on ternary MoS$_{2(1-x)}$Se$_{2x}$ single crystals. By comparing the relative peak intensity between 250 cm$^{-1}$ and 380 cm$^{-1}$, wherein the estimated the atomic ratio between S and Se to be around 1, which is further supported by the EDS analysis (FIG. 5).

Figure 3:
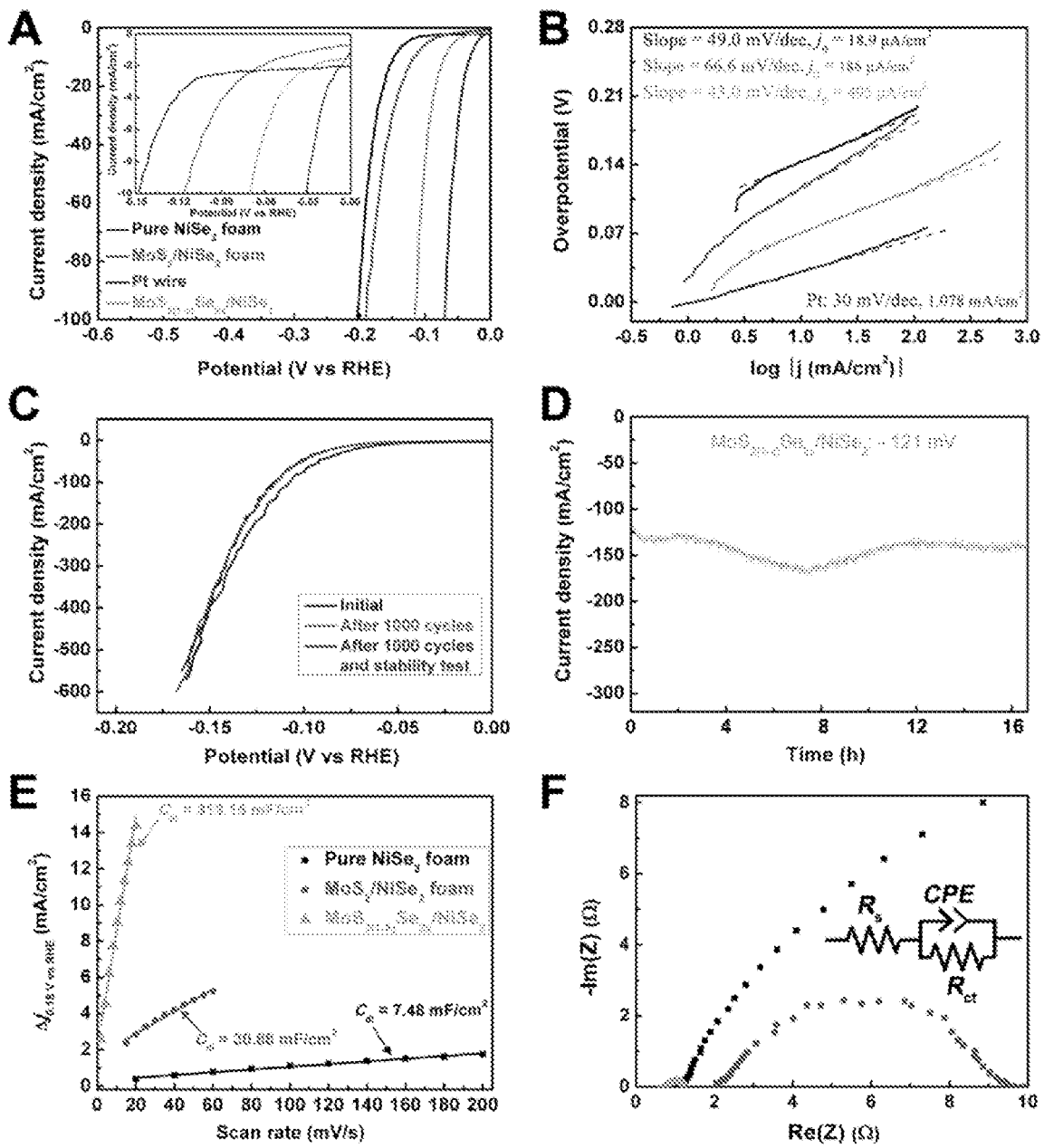
FIG. 3. Shows the electro-catalytic performance of different catalysts for hydrogen evolution.
Figure 6:
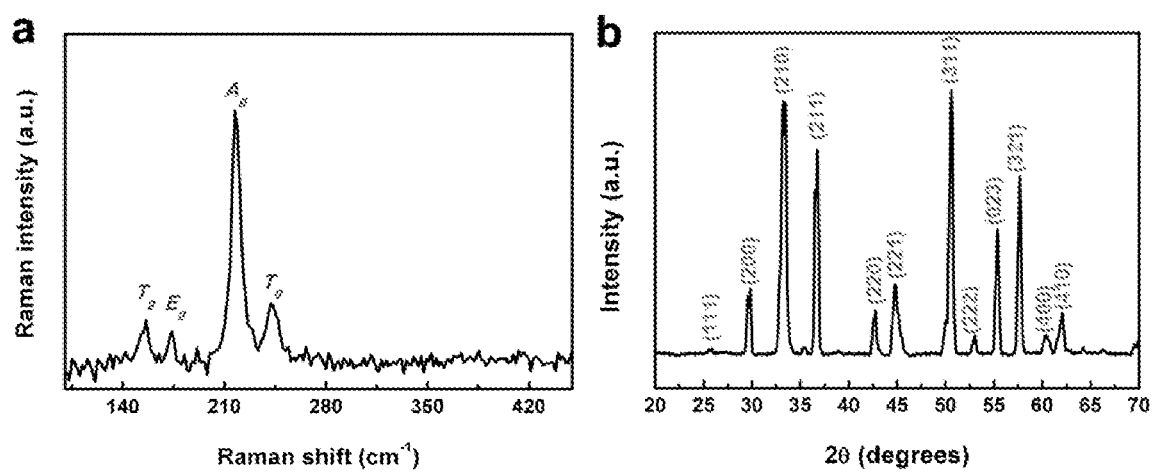
FIG. 6 shows Xray Powder Defraction Analysis of embodiments of the catalysts herein described.

To evaluate the catalytic performance of these ternary MoS, it was estimated that the atomic ratio between S and Se to be around 1, which is further supported by the EDS analysis (FIG. 6) To evaluate the catalytic performance of the ternary MoS$_{2(1-x)}$Se$_{2x}$ particles grown on 3D porous NiSe$_2$ foam, electro-catalytic measurements were performed via a standard three-electrode setup in a 0.5M H$_2$SO$_4$ electrolyte de-aerated with high-purity N$_2$ were performed. The loading of MoS$_{2(1-x)}$Se$_{2x}$ catalysts is around 4.5 mg/cm$^2$, and FIG. 3a shows that the self-standing porous hybrid catalyst can afford geometric current densities of about 10 mA/cm$^2$ at a low overpotential 69 mV for the ternary MoS$_{2(1-x)}$Se$_{2x}$ hybrid electrode. In contrast, for binary MoS$_2$ on NiSe$_2$ foam and pure NiSe$_2$ foam, overpotentials of 116 mV and 192 mV respectively are needed to achieve about 10 mA/cm$^2$. The catalytic overpotential (69 mV) of the MoS$_{2(1-x)}$Se$_{2x}$/NiSe$_2$ hybrid is also much lower than those of the best catalysts thus far based on LTMDs MoS$_2$ (−110 mV), WS$_2$ (−142 mV) and WS$_{2(1-x)}$Se$_{2x}$ (−170 mV), and first-row transition metal dichalcogenides CoSe$_2$ (−139 mV), NiSe$_2$ (−136 mV) and CoS$_2$ (−142 mV). This suggests that the ternary MoS$_{2(1-x)}$Se$_{2x}$ particles/NiSe$_2$ foam hybrid is a highly functional HER catalyst. Further, a Tafel slope, which is an inherent property of the catalyst, can be obtained by extracting the slopes from the linear regions in Tafel plots (FIG. 3b). It is found that the ternary electrode possesses a smaller Tafel slope (43 mV/dec) than that of binary MoS$_2$ on NiSe$_2$ foam (67 mV/dec) and pure NiSe$_2$ foam (49 mV/dec). In addition, the hybrid catalyst disclosed herein leads to a Tafel slope much lower than many previously reported cheap and efficient HER catalysts in the same electrolyte. Further, based on the intercept of the linear region of the Tafel plots, the exchange current densities (j$_{0,geometrical}$) at the thermodynamic redox potential (η=0) can be calculated to be 495 μAcm$^{-2}$ for the ternary-phase hybrid catalysts with NiSe$_2$ foam. This exchange current density is one to two orders of magnitude larger than those of layered transition metal dichalcogenides MoS$_2$ and WS$_2$, or first-row transition metal dichalcogenides CoSe$_2$ and CoS$_2$ catalysts of the prior art. It is well known that it is difficult to prepare a self-standing catalyst simultaneously possessing low onset overpotential, large current density, small Tafel slope and large exchange current density. Thus, considering the small onset overpotential (~20 mV), large current density (−69 mV at 10 mA/cm$^2$), low Tafel slopes (~43 mV/dec) and large exchange current density (~495 μAcm$^{-2}$), embodiments of the catalyst disclosed herein comprise catalytic function at a level displayed by Pt catalysts of the prior art, and are also catalytically higher functioning than most MoS$_2$-based catalysts.

Aside from a stringent requirement for high HER activity, stability is another important criterion in evaluating the catalytic performance of an electro-catalyst. In embodiments disclosed herein, a long-term cyclic voltammetry test between −0.20 and 0.07 V vs RHE shows no significant degradation of cathodic current densities for the catalyst before, and after 1000 cycles (FIG. 3c). In other embodiments, the cathodic current density for the hybrid catalyst remains stable, and exhibits no obvious degradation for electrolysis at a given potential over a long period (FIG. 3d), suggesting the potential use of this catalyst over a long time in an electrochemical process. In some embodiments, after long-term stability and cyclability tests, the catalytic performance of the hybrid catalyst disclosed herein still shows no degradation (FIG. 3c).

Figure 7:
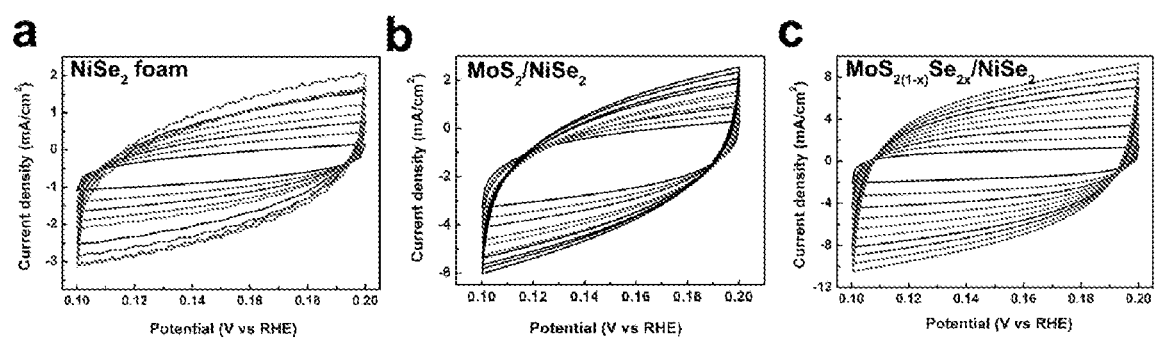
FIG. 7 shows electrochemical double-layer capacitances ($C_{dl}$) for evaluation of the electrochemically effective surface areas of catalysts herein disclosed.

To elucidate the origin of the differences in the overall catalytic performance among different catalysts, a simple cyclic voltammetry (CV) method was utilized in some embodiments to measure the corresponding electrochemical double-layer capacitances (C$_{dl}$), and therefore allowing evaluation of the electrochemically effective surface areas (FIG. 7). Taking consideration of the direct proportion between the effective surface area and double-layer capacitance, capacitance values C$_{dl}$ may be directly compared. By plotting the positive and negative current density differences (Δj=j$_a$-j$_c$) at a given potential (0.15 V vs. RHE) against the CV scan rates, the double-layer capacitances (C$_{dl}$), which is equal to half the value of the linear slopes of the fitted lines in the plots, can be calculated. As shown in FIG. 3e, the MoS$_{2(1-x)}$Se$_{2x}$/NiSe$_2$ hybrid electrode exhibits a C$_{dl}$ value of 319.15 mF/cm$^2$, which is one order of magnitude larger than that of pure MoS$_2$/NiSe$_2$ foam (30.88 mF/cm$^2$) and about 40 times larger than that of pure NiSe$_2$ foam (7.48 mF/cm$^2$), demonstrating the proliferation of active sites in the porous hybrid catalyst, which accordingly results in the improved catalytic performance. In some embodiments, electrochemical impedance spectroscopy (EIS) was carried out to examine the electrode kinetics under the catalytic HER operating conditions (FIG. 3f). According to the Nyquist plots and data fitting to a simplified Randles circuit, the results disclosed herein clearly reveal that the charge-transfer resistance ($R_{ct}$~0.5Ω) for the $MoS_{2(1-x)}Se_{2x}/NiSe_2$ hybrid is smaller than that for pure $MoS_2/NiSe_2$ ($R_{ct}$~8Ω) or for porous $NiSe_2$ foam alone ($R_{ct}$~22Ω), which may be due to the chemical bonding between $MoS_{2(1-x)}Se_{2x}$ and $NiSe_2$ foam in contrast to the physisorption of $MoS_2$ particles on solid $NiSe_2$. This was confirmed by the quantum mechanics (QM) calculations as described below. Additionally, all the catalysts have very small series resistances ($R_s$~0.6-1.2Ω), indicative of high-quality electrical integration of the catalyst with the electrode. Therefore, to understand the improvement on the catalytic hydrogen evolution of the $MoS_{2(1-x)}Se_{2x}/NiSe_2$ hybrid catalysts, QM calculations at the density functional theory (DFT) level (PBE flavor) were performed to calculate the binding free energies of hydrogen on the Mo atom.

Figure 4:
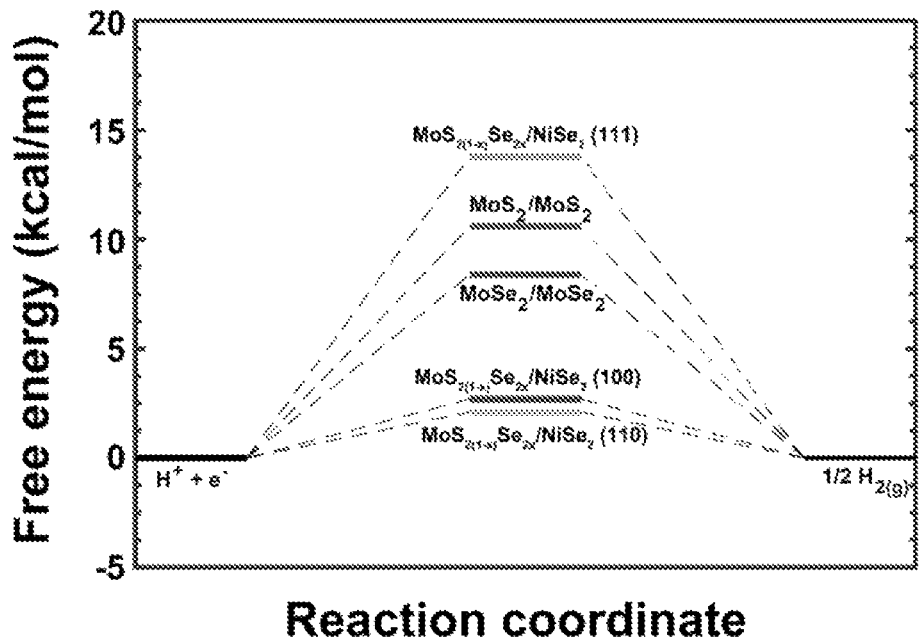
FIG. 4. Shows density functional theory calculations.
Figure 4:
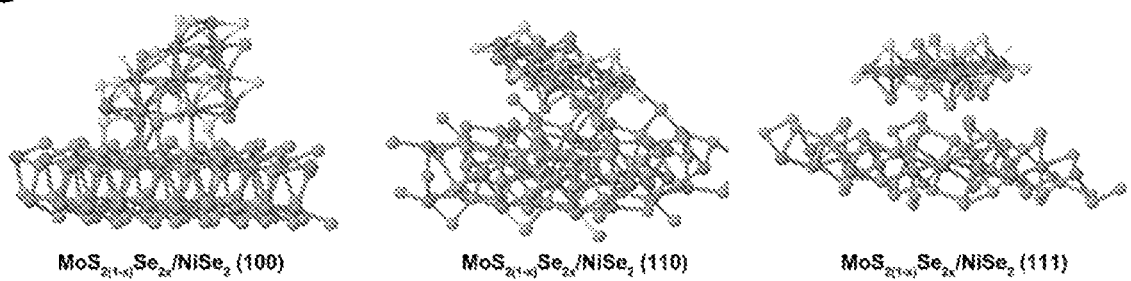

To further analyze the improvement on the catalytic hydrogen evolution of the $MoS_{2(1-x)}Se_{2x}/NiSe_2$ hybrid catalysts, QM calculations at the density functional theory (DFT) level (PBE flavor) were performed to calculate the binding free energies of hydrogen on the Mo atom (See for example: Zhou H. et al., Efficient hydrogen evolution by ternary molybdenum sulfoselenide particles on self-standing porous nickel diselenide foam, *Nature Comms.* 2016, 7, 12765 (doi:10.1038/ncomms12765); and Zhou, H., et al, Outstanding Hydrogen evolution reaction in water splitting catalyzed by porous nickel diselenide electro-catalysts like Pt, *Energy and Environ Sci.*, 2016, 00, 1-3; each of which is incorporated herein in its entirety by reference). Although it was originally assumed that the edge S atom is the catalytic atom in hydrogen evolution on $MoS_2$ embodiments herein it is found that $H_2$ formation proceeds through the Mo atom via the Heyrovsky reaction and has a lower barrier than the Heyrovsky and Volmer reaction on the S atom. Therefore, a lower hydrogen binding energy on the Mo atom was used as the indicator for lower barrier in the Heyrovsky step. Since there are various exposed facets in the as-prepared $NiSe_2$ foam (FIG. 6), the reaction was in some embodiments modeled on the simple low-index (100), (110) and (111) surfaces of $NiSe_2$. As shown in FIG. 4a, $\Delta G_{H^*}$ is 8.4 kcal/mol for hydrogen adsorbed on $MoS_{2(1-x)}Se_{2x}/MoS_{2(1-x)}Se_{2x}$, which is more reactive than $MoS_2/MoS_2$ with a $\Delta G_{H^*}$ of 10.6 kcal/mol, agreeing with the reported experimental result. In contrast, once the $MoS_{2(1-x)}Se_{2x}$ particles are hybridized with $NiSe_2$ foam, the relevant $\Delta G_{H^*}$ on $MoS_{2(1-x)}Se_{2x}/NiSe_2$(100) and $MoS_{2(1-x)}Se_{2x}/NiSe_2$(110) are further decreased to 2.7 kcal/mol and 2.1 kcal/mol, respectively, making these hybrid catalysts more active than $MoS_2/MoS_2$ and $MoS_{2(1-x)}Se_{2x}/MoS_{2(1x)}Se_{2x}$ in the HER process. To understand the reason for the improved reactivity of $MoS_{2(1-x)}Se_{2x}/NiSe_2$ hybrid catalysts, intermediate structures (FIG. 4b) were further examined. $MoS_{2(1-x)}Se_{2x}$ in some embodiments is found to be chemically bonded to the $NiSe_2$ substrate on the (100) and (110) surfaces, allowing the electrons to delocalize into the substrate, thus lowering the binding energies of hydrogen and ensuring quick charge transfer in the HER process as confirmed in the EIS spectra. Thus, DFT calculations corroborate that the $MoS_{2(1-x)}Se_{2x}/NiSe_2$ hybrid is an effective electro-catalyst (FIG. 4).

Thus, disclosed herein in some embodiments, are robust and stable hydrogen evolving catalysts, wherein such catalysts are synthesized by growing ternary $MoS_{2(1-x)}Se_{2x}$ particles on a 3D porous and metallic $NiSe_2$ foam. In some embodiments, experimental and theoretical results show that these $MoS_{2(1-x)}Se_{2x}NiSe_2$ hybrid catalysts exhibit catalytic performance in the order of the LTMD catalysts (such as $MoS_2$, $WS_2$) and first-row transition metal pyrites ($CoSe_2$, $CoS_2$, $NiSe_2$, etc.) of the prior art. In some embodiments, the catalysts disclosed herein are effective in catalyzing hydrogen production by integrating metal dichalcogenides and pyrites into three-dimensional hybrid architectures that possess high surface area, mesoporous structures, good electrical conductivity, and abundant active edge sites, making effective such catalysts effective and efficient for large-scale water splitting.

Example 2

A further embodiment comprises an efficient and durable hybrid catalyst composed of tungsten sulfoselenide $WS_{2(1-x)}Se_{2x}/NiSe_2$ particles supported by 3D porous $NiSe_2$ foam which was formulated from commercial Ni foam via thermal selenization (see for example: Zhou H. et al., Highly Efficient Hydrogen Evolution from Edge-Oriented $WS_{2(1-x)}Se_{2x}/NiSe_2$, *Nano Lett.*, 2016, 16 (12), pp 7604-7609, incorporated herein in its entirety by reference). Particles disperse uniformly on a $NiSe_2$ surface with a large number of exposed edge sites. Therefore in some embodiments $WS_{2(1-x)}Se_{2x}/NiSe_2/NiSe_2$ hybrid foam can be directly employed as a 3D self-standing hydrogen-evolving electrode. In some embodiments an electrode as disclosed herein exhibits an effective HER performance and produces a large current density (in the order of about −10 mA/cm² at only −88 mV), a low Tafel slope (in the order of about 46.7 mV/dec), large exchange current density (in the order of about 214.7 μA/cm²), and is electrochemical stabile.

In some embodiments the catalytic properties are superior to many catalysts of the prior art, which may in part be attributed to the synergistic effects of good conductivity and high surface area of porous $NiSe_2$ foam, and a large number of active edge sites from ternary $WS_{2(1-x)}Se_{2x}/NiSe_2$ particles.

Figure 8:
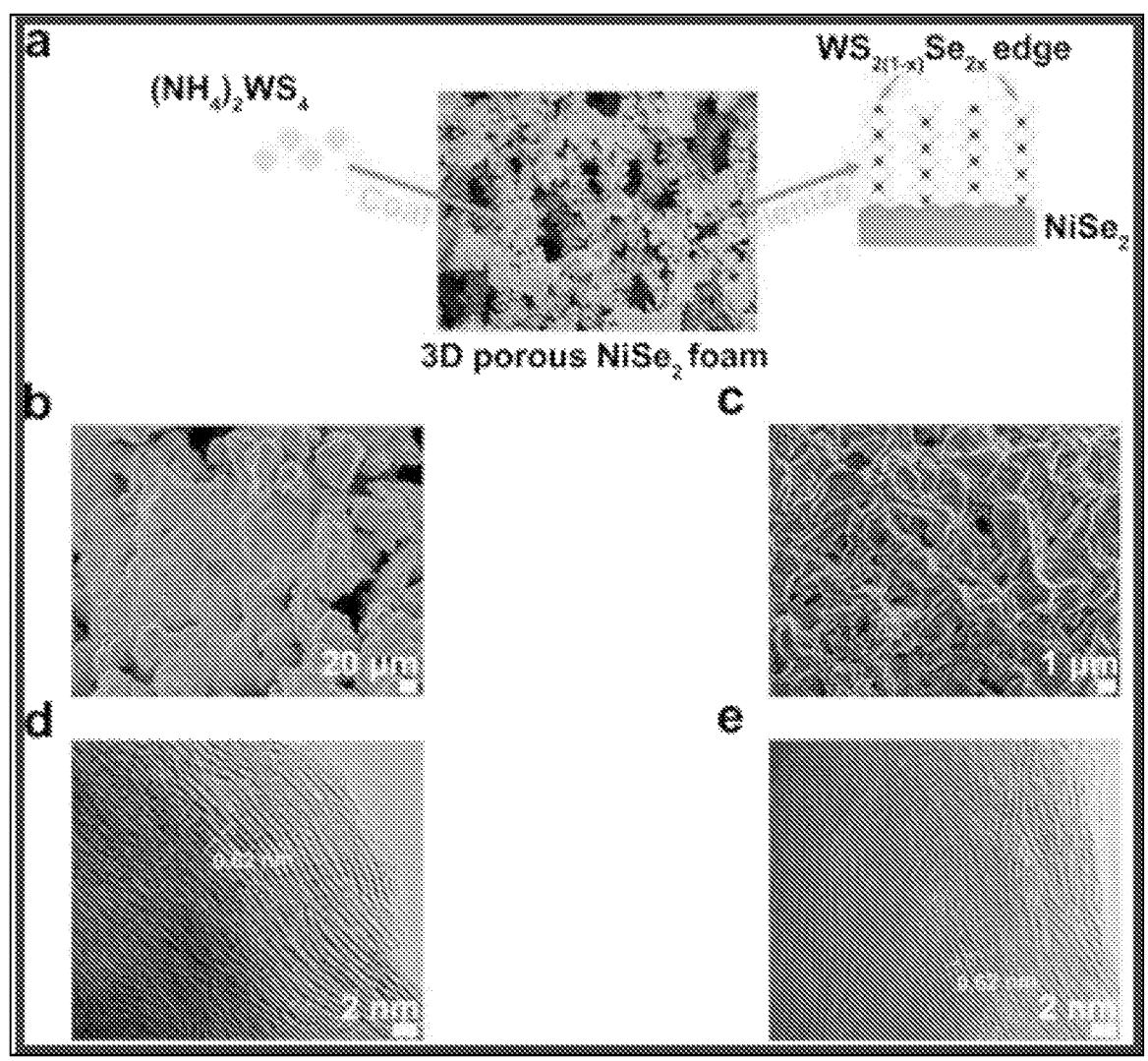
FIG. 8 shows a schematic diagram (a) and detailed morphologies (b-e) of edge-oriented $WS_{2(1-x)}Se_{2x}$ particles supported on 3D porous NiSe$_2$ foam. Low (b) and high (c) magnification SEM morphologies of $WS_{2(1-x)}Se_{2x}$ particles grown at 500° C. on 3D porous NiSe$_2$ foam. (d,e) Typical HRTEM images showing a large number of exposed edge sites in $WS_{2(1-x)}Se_{2x}$ particles grown on 3D porous NiSe$_2$ foam.

In some embodiments, the synthesis of the catalyst commences with the growth of porous $NiSe_2$ foam from commercially available Ni foam by direct selenization (FIG. 8). In some embodiments the original Ni foam is composed of Ni grains that are micrometer in size. After thermal conversion of Ni foam into metallic $NiSe_2$ foam, additional porous structures with rough surface are generated, and in some embodiments most of metallic Ni is converted to pyrite $NiSe_2$ as confirmed by powder X-ray diffraction pattern, wherein the remaining small amount of metallic Ni contributes to the total conductivity of porous $NiSe_2$ samples. The as-grown $NiSe_2$ samples were in some embodiments modified with a $(NH_4)_2WS_4$ precursor, followed by a second selenization at 500° C. in a tube furnace. The SEM images (FIG. 8b,c) show that the $WS_{2(1-x)}Se_{2x}/NiSe_2$ particles are uniformly dispersed on a porous $NiSe_2$ foam, which plays a significant role in the catalytic performance because of the increased active sites. High-resolution transmission electron microscopy (HRTEM), indicate that in some embodiments the layers of $WS_{2(1-x)}Se_{2x}/NiSe_2$ particles are exposed on the surface of $NiSe_2$ foam (FIGS. 8d and e), which may be attributed to the rough and curved surface of $NiSe_2$ foam that is used for layer orientation of $WS_{2(1-x)}Se_{2x}/NiSe_2$ particles. These exposed layers of $WS_{2(1-x)}Se_{2x}/NiSe_2$ particles then provide a large number of active edge sites for the HER. Considering the metallic feature and porous structures of $NiSe_2$ foam and that each layer of $WS_{2(1-x)}Se_{2x}/NiSe_2$ particles is in some embodiments in direct contact with the $NiSe_2$ foam, the electrical contact between the $WS_{2(1-x)}Se_{2x}/$ NiSe$_2$ catalyst and the electrode is increased, which ensures quick electron transfer from the electrode to the WS$_{2(1-x)}$Se$_{2x}$/NiSe$_2$ particles.

Moreover, in some embodiments, the many porous structures provided by NiSe$_2$ foam quicken the proton transfer from the electrolyte to the catalyst surface because of high surface area. Thus, in some embodiments the hybrid catalysts simultaneously possess good electrical contact, high-density active edge sites, and 3D porous structures with high surface area, all of which contribute greatly to the electro-catalytic hydrogen evolution. X-ray photoelectron spectroscopy (XPS) and Raman spectroscopy were utilized to further characterize the chemical composition of the as-prepared catalysts.

Figure 9:
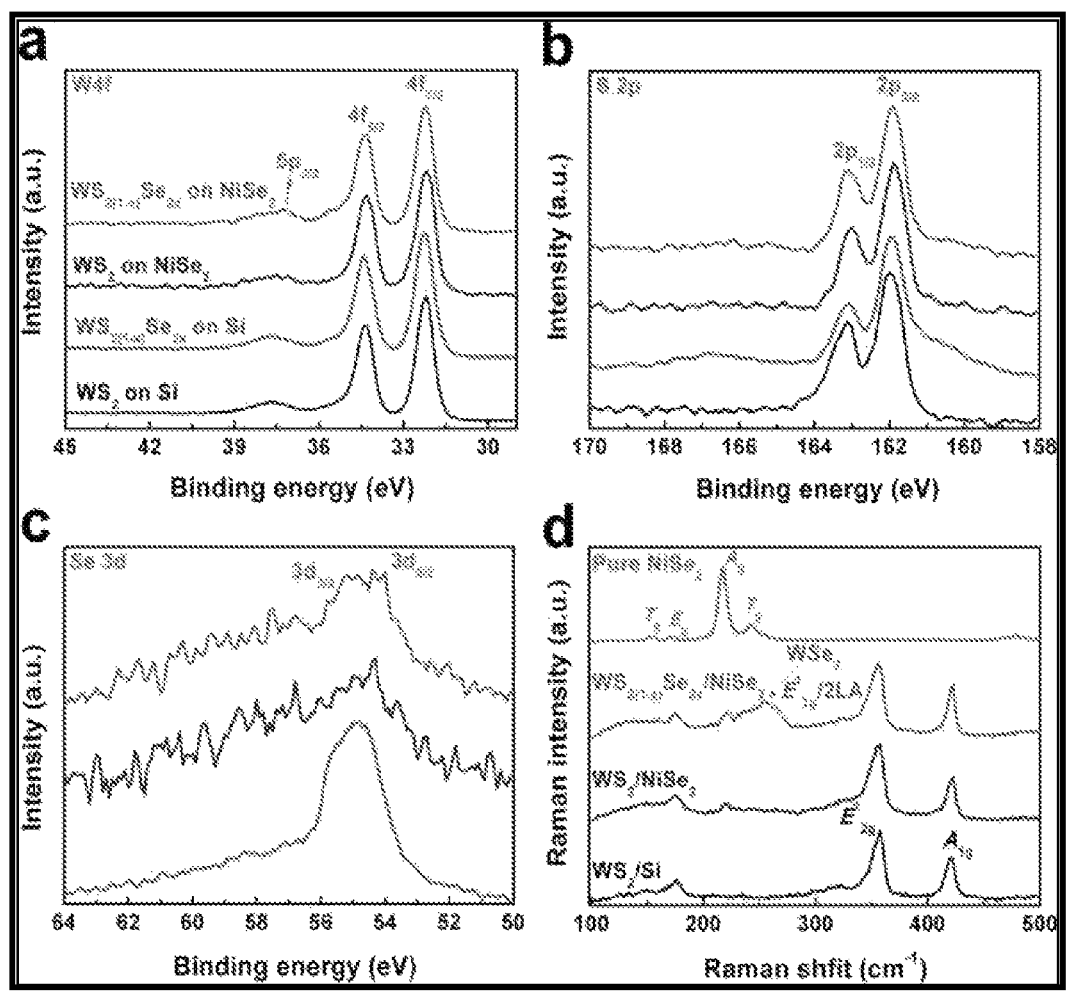
FIG. 9. Shows chemical composition analysis of the hybrid catalyst by XPS and Raman spectroscopy. (a) W 4f, (b) S 2p, and (c) Se 3d XPS spectra of the $WS_{2(1-x)}Se_{2x}$-based materials. (d) Raman spectra of the WS$_2$ or $WS_{2(1-x)}Se_{2x}$ particles on different substrates.

In some embodiments, XPS spectra collected on WS$_{2(1-x)}$Se$_{2x}$/NiSe$_2$/NiSe$_2$ hybrid material, detected each of Ni, W, S, and Se elements (FIG. 9a-c]. The origin of Se (i.e. whether the signal originates from the WS$_{2(1-x)}$Se$_{2x}$/NiSe$_2$ particles or NiSe$_2$ foam) was clarified by performing a selenization at 500° C., and by growing the tungsten compound on a Si substrate to clearly detect the presence of W, S, and Se elements in the relevant XPS data (FIG. 9a-c). In further embodiments it is possible to detect the WS$_{2(1-x)}$Se$_{2x}$/NiSe$_2$ particles on a porous NiSe$_2$ foam by Raman spectroscopy because of different vibration modes between NiSe$_2$ and WS$_{2(1-x)}$Se$_{2x}$/NiSe$_2$. As shown in FIG. 9d, for pure NiSe$_2$ foam, there are four vibration peaks ascribed to the Tg (153.6 cm−1), Eg (172.2 cm$^{-1}$), Ag (217.7 cm$^{-1}$), and Tg (243.7 cm$^{-1}$) modes of NiSe$_2$ while for pure WS$_2$, two prominent Raman peaks are detected at 357.5 and 421.0 cm$^{-1}$, which can be attributed to the E$^1_{2g}$ and A$_{1g}$ modes, respectively. Compared to pure WS$_2$/NiSe$_2$ foam, there is another broad peak appearing at around 257 cm$^{-1}$ for WS$_{2(1-x)}$Se$_{2x}$/NiSe$_2$, which can be clearly found on the Raman spectra of WS$_{2(1-x)}$Se$_{2x}$/NiSe$_2$/NiSe$_2$, and is associated with the corresponding WSe$_2$-like E$^1_{2g}$/2LA features. These observations in Raman and XPS data confirm the formation of ternary WS$_{2(1-x)}$Se$_{2x}$/NiSe$_2$ particles on porous NiSe$_2$ foam, as compared to bench mark data. In some embodiments and based on Raman spectra, the factor x showing the atomic ratio between S and Se is around 0.3, which is further demonstrated by the X-ray energy dispersive spectroscopy measurement.

In some embodiments, the electro-catalytic hydrogen evolution of the hybrid catalysts, were analyzed by performing electrochemical measurements in a three-electrode configuration in a N$_2$-saturated 0.5 M H$_2$SO$_4$ electrolyte. The loading of WS$_2$ or WS$_{2(1-x)}$Se$_{2x}$/NiSe$_2$ particles on porous NiSe$_2$ foam is at about 5.4 mg/cm$^2$. All of the potentials reported here are referenced to the reversible hydrogen electrode (RHE).

Figure 10:
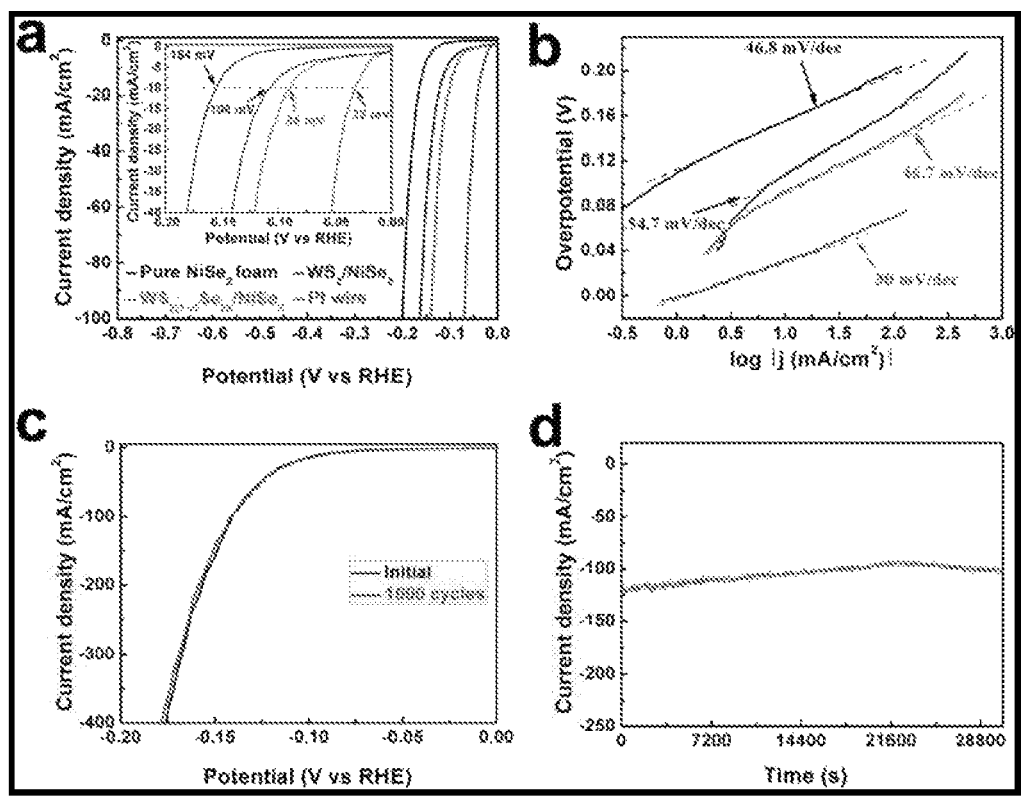
FIG. 10. Shows electrochemical performance of as-prepared hybrid electro-catalysts in comparison with a Pt wire and pure NiSe$_2$ support. (a) The polarization curves recorded on different catalysts: pure NiSe$_2$ foam, WS$_2$ on porous NiSe$_2$ foam, $WS_{2(1-x)}Se_{2x}$ on porous NiSe$_2$ foam and a Pt wire. (b) The corresponding Tafel plots extracted from the curves shown in panel a. (c) Polarization curves of $WS_{2(1-x)}Se_{2x}$/NiSe$_2$ catalyst initially and after 1000 CV scans. (d) Time dependence of current density of the hybrid catalyst under a static overpotential of −145 mV.

FIG. 10a shows the polarization curves recorded on the as-prepared hybrid catalysts. For comparison, curves collected on binary WS$_{2(1-x)}$Se$_{2x}$/NiSe$_2$, pure NiSe$_2$ foam, and a Pt wire are shown, wherein in some embodiments the WS$_{2(1-x)}$Se$_{2x}$/NiSe$_2$ hybrid catalyst can provide a geometric current density of −10 mA/cm$^2$ at only −88 mV, which is much lower than −108 mV for WS$_2$/NiSe$_2$ and −154 mV for pure NiSe$_2$ foam. This performance outperforms many reported catalysts in the prior art illustrating the effective catalytic performance of ternary WS$_{2(1-x)}$Se$_{2x}$/NiSe$_2$ particles/NiSe$_2$ foam hybrids reported here for the HER. In addition, the Tafel slope of the WS$_{2(1-x)}$Se$_{2x}$/NiSe$_2$/NiSe$_2$ hybrid is only 46.7 mV/dec (FIG. 10b). The exchange current density (j$_0$) is calculated to be around 214.7 µA/cm$^2$, larger than most of the values reported on the well-known MoS$_2$, WS$_2$, and CoSe$_2$ catalysts. This, in some embodiments, may be due to the increased active edge sites from WS$_{2(1-x)}$Se$_{2x}$/NiSe$_2$ particles grown on porous NiSe$_2$ foam.

In some embodiments, the hybrid catalysts are also electrochemically stable in 0.5M H$_2$SO$_4$. For example, after 1000 cycles, the polarization curve is almost the same as that of the initial one, indicating no observable degradation after long-term cycling tests (FIG. 10c). The practical operation of the catalyst was examined in electrolysis at a fixed potential over a long period (FIG. 10d), and at a given overpotential of −145 mV, there is no observable decrease in the current density at ~120 mA/cm$^2$ for electrolysis over 8 h for the hybrid WS$_{2(1-x)}$Se$_{2x}$/NiSe$_2$/NiSe$_2$ catalyst, indicating its potential usage in water splitting for a long time.

Figure 11:
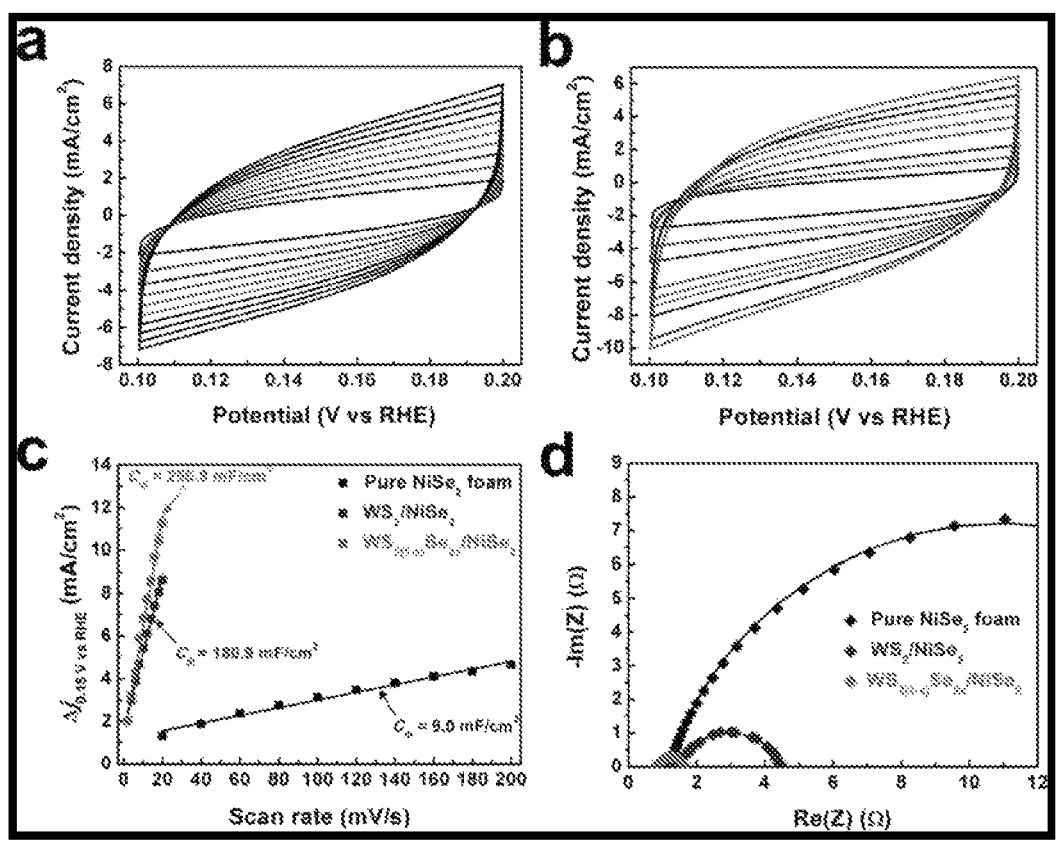
FIG. 11. Shows double-layer capacitance ($C_{dl}$) measurements and Nyquist plots by EIS. (a) Electrochemical cyclic voltammogram of WS$_2$/NiSe$_2$ hybrid catalyst at different scan rates from 2 to 20 mV/s with an interval point of 2 mV/s. (b) Electrochemical cyclic voltammogram of $WS_{2(1-x)}Se_{2x}$/NiSe$_2$ hybrid catalysts with the scan rates ranging from 2 to 18 mV/s with an interval point of 2 mV/s. (c) Linear fitting of the capacitive currents of the catalysts vs the scan rates. (d) Nyquist plots showing the facile electrode kinetics of the hybrid catalysts $WS_2/NiSe_2$ and $WS_{2(1-x)}Se_{2x}/NiSe_2$.

Further, in some embodiments to evaluate the differences in the electrochemically effective surface areas of the catalysts disclosed herein, the electrochemical double-layer capacitances (Cdl) were measured via a simple cyclic voltammetry (CV) method as displayed in FIG. 11a,b. By drawing the current difference between anodic and cathodic current densities ($\Delta j = j_{anodic} - j_{cathodic}$) against each scan rate at a given potential of 0.15 V, a linear fitting may be conducted, and the Cdl is derived from the linearly fitted curves, which is half the value of the linear slopes. As shown in FIG. 11c, the Cdl values are extracted to be 256.9 mF/cm$^2$ for the WS$_{2(1-x)}$Se$_{2x}$/NiSe$_2$/NiSe$_2$ hybrid catalyst, which is larger than 180.9 mF/cm$^2$ of pure WS2/NiSe$_2$ foam and nearly 28.5 times of 9.0 mF/cm$^2$ of pure NiSe$_2$ foam. Thus, in some embodiments, given that there is a linear relationship between the electrochemical-surface area and the capacitance Cdl, the relative electrochemically active surface area can be derived, which may be further used to normalize the exchange current density j$_{0,normalized}$. In some embodiments the normalized exchange current density of WS$_{2(1-x)}$Se$_{2x}$/NiSe$_2$/NiSe$_2$ (8.54 µA/cm$^2$) is larger than that of WS$_2$/NiSe$_2$ (6.46 µA/cm$_2$), suggesting improved intrinsic catalytic activity by Se doping. Meanwhile, electrochemical impedance spectroscopy (EIS) was applied to study the electrode kinetics of the catalysts. Nyquist plots (FIG. 11d) reveal a decrease of charge-transfer resistance (Rct) for the ternary WS$_{2(1-x)}$Se$_{2x}$/NiSe$_2$/NiSe$_2$ hybrid (0.8-1.3Ω) in contrast to the binary WS$_2$/NiSe$_2$ hybrid (3.2Ω) and pure NiSe$_2$ foam (19.6Ω). Furthermore, all of the catalysts exhibit very small series resistances (~1Ω), meaning that effective electrical integration is ensured by metallic NiSe$_2$ foam.

In some embodiments, and on the basis of the improved catalytic performance and EIS spectra, the substitution of S by Se atoms may affect the electrical conductivity of the ternary phase WS$_{2(1-x)}$Se$_{2x}$/NiSe$_2$ and thereby the hydrogen adsorption free energy. The enhanced electrical conductivity improves the electron transfer between WS$_{2(1-x)}$Se$_{2x}$/NiSe$_2$ catalyst and NiSe$_2$ support, and consequently, Cdl measurements and EIS results confirm that WS$_{2(1-x)}$Se$_{2x}$/NiSe$_2$/NiSe$_2$ hybrid catalyst exhibits more facile electrode kinetics toward hydrogen evolution, which may be attributed to the good conductivity and porous structures of the NiSe$_2$ foam, and the active edge sites from WS$_{2(1-x)}$Se$_{2x}$/NiSe$_2$ particles. In conclusion, the catalytic HER activity of transition-metal dichalcogenides is increased by making 3D porous architectures of layered WS$_{2(1-x)}$Se$_{2x}$/NiSe$_2$ particles on metallic NiSe$_2$ foam. Good conductivity and porous structures of NiSe$_2$ foam and a large number of active edge sites from WS$_{2(1-x)}$Se$_{2x}$/NiSe$_2$ particles were created, which makes the hybrid catalyst highly active and efficient for HER, and stable in acid over a long period. Thus providing a basis for the fabrication of robust and stable electro-catalysts for large-scale water splitting and satisfying an unmet need in the art. References cited herein are incorporated herein by this reference in their entirety).

While exemplary embodiments of the disclosure have been shown and described, modifications thereof may be made by one skilled in the art without departing from the spirit and teachings of those embodiments. The embodiments described herein are exemplary only, and are not intended to be limiting. Many variations and modifications of the disclosed embodiments are possible and are within the scope of the claimed disclosure. Where numerical ranges or limitations are expressly stated, such express ranges or limitations should be understood to include iterative ranges or limitations of like magnitude falling within the expressly stated ranges or limitations (such as from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k^* (R_u-R_l)$, wherein k is a variable ranging from 1 percent to 100 percent with a 1 percent increment, i.e., k is 1 percent, 2 percent, 3 percent, 4 percent, 5 percent, . . . 50 percent, 51 percent, 52 percent, 95 percent, 96 percent, 97 percent, 98 percent, 99 percent, or 100 percent. Moreover, any numerical range defined by two R numbers as defined in the above is also specifically disclosed. Use of the term "optionally" with respect to any element of a claim is intended to mean that the subject element is required, or alternatively, is not required. Both alternatives are intended to be within the scope of the claim. Use of broader terms such as comprises, includes, having, etc. should be understood to provide support for narrower terms such as consisting of, consisting essentially of, comprised substantially of, etc.

Accordingly, the scope of protection is not limited by the description set out above but is only limited by the claims which follow, that scope including all equivalents of the subject matter of the claims. Each and every claim is incorporated into the specification as an embodiment of the present disclosure. Thus, the claims are a further description and are an addition to the embodiments of the present disclosure. The disclosures of all patents, patent applications, and publications cited herein are hereby incorporated by reference, to the extent that they provide exemplary, procedural or other details supplementary to those set forth herein.

What is claimed is:

1. A three dimensional (3D) hydrogen evolution reaction (HER) catalyst, comprising:
    a porous nickel (Ni) foam support;
    a $NiSe_2$ scaffold positioned on the porous Ni foam support; and
    a layered transition metal dichalcogenide (LTMDC) particles, or first-row transition metal dichalcogenides (TMDC) particles with binary or ternary phase positioned on the $NiSe_2$ scaffold.

2. The catalyst of claim 1, wherein the layered transition metal dichalcogenides (LTMDC) particles are selected from the group consisting of $CoS_2$, $CoSe_2$, $FeS_2$, $FeSe_2$, $NiSe_2$, $NiS_2$, $MoS_2$, $WS_2$, $MoSe_2$, $WSe_2$, and a combination thereof.

3. The catalyst of claim 1, wherein the layered transition metal dichalcogenides (LTMDC) particles comprise $MoS_{2(1-x)}Se_{2x}$ or $WS_{2(1-x)}Se_{2x}$ particles.

4. The catalyst of claim 3, wherein the layered transition metal dichalcogenides (LTMDC) particles comprise vertically oriented layers or edge-oriented layers.

5. The catalyst of claim 1, wherein the $NiSe_2$ scaffold comprises mesoporous pores.

6. The catalyst of claim 5, wherein the mesoporous pores are between 0.001 nm and 50 nm in diameter.

7. The catalyst of claim 5, wherein the mesoporous pores comprise a surface roughness (Ra) of between 0.1 and 50.

8. The catalyst of claim 4, wherein the $NiSe_2$ scaffold comprises active edge sites for HER.

9. The catalyst of claim 1, wherein the catalyst has at least one of: a low onset potential, large cathode current density, small Tafel slopes, or large exchange current density.

10. A method of making a three dimensional hydrogen evolution reaction (HER) catalyst, comprising:
    positioning a porous nickel (Ni) foam support,
    selenizating said porous Ni foam support, and forming a $NiSe_2$ scaffold; and
    growing layered transition metal dichalcogenides (LTMDC) particles on the $NiSe_2$ scaffold, to form a three dimensional hydrogen evolution reaction (HER) catalyst.

11. The method of claim 10, wherein said selenizating is in an Ar atmosphere.

12. The method of claim 10, wherein said selenizating is at 450° C.-600° C.

13. The method of claim 10, wherein the $NiSe_2$ scaffold is HER active, and the grown layered transition metal dichalcogenides comprises a large number of exposed active edge sites.

14. The method of claim 10, wherein said layered transition metal dichalcogenide particles comprise $MoS_{2(1-x)}Se_{2x}$ particles or $WS_{2(1-x)}Se_{2x}$ particles.

15. The method of claim 14, wherein said growing of said particles is in a vertical layer orientation from the $NiSe_2$ scaffold.

16. The method of claim 15, wherein one layer of said particles is about 0.1 to 75 nm in thickness.

17. The method of claim 10, wherein the layered transition metal dichalcogenides (LTMDC) particles are grown at between 450° C. and 600° C.

18. The method of claim 10 wherein the catalyst comprises a large 3-D porous surface area.

19. An electrode, comprising:
    a three dimensional Hydrogen Evolution Reaction (HER) catalyst, wherein said electrode comprises:
    a porous $NiSe_2$ foam support; and
    a layered transition metal dichalcogenides (LTMDC) particles, or first-row transition metal dichalcogenides positioned on the porous $NiSe_2$ foam support, and wherein said HER catalyst has at least one of: a low onset potential, a large cathode current density, a small Tafel slopes or a large exchange current density.

20. The electrode of claim 19, wherein a low onset potential is between −10 and 200 mV; a large cathode current density is between −10 mV at 10 mA/cm$^2$ to about −120 mV at 10 mA/cm$^2$; a small Tafel slopes is between 10 mV/dec to about 100 mV/dec; and a large exchange current density is between 10 to about 1000 μA/cm$^2$.

* * * * *